United States Patent [19]

Moreland

[11] 4,028,024
[45] June 7, 1977

[54] MANUFACTURE OF FILLED CAPSULES OR THE LIKE

[76] Inventor: Stephen T. Moreland, 789 Anita Ave., Grosse Pointe Woods, Mich. 48236

[22] Filed: Sept. 30, 1976

[21] Appl. No.: 728,140

Related U.S. Application Data

[63] Continuation-in-part of Ser. No. 519,435, Oct. 31, 1974, abandoned.

[52] U.S. Cl. .......................... 425/133.1; 425/296; 425/327; 425/444; 425/804; 99/450.6
[51] Int. Cl.² ........................................ B29D 31/00
[58] Field of Search ................. 99/450.6; 164/277; 426/108, 125, 126, 128; 425/4 C, 133.1, 133.5, 235, 236, 237, 294, 296, 298, 306, 308, 327, 335, 337, 363, 367, 455, 804, 817 C, 147, 132, 5; 264/241, 249; 53/140

[56] References Cited

UNITED STATES PATENTS

| | | | |
|---|---|---|---|
| 277,707 | 5/1883 | Gonon | 425/132 X |
| 2,387,747 | 10/1945 | Cowley | 53/140 X |
| 2,449,139 | 9/1948 | Power | 425/5 |
| 2,714,861 | 8/1955 | Castronuovo | 425/235 X |
| 2,874,417 | 2/1959 | Ramse | 425/404 X |
| 3,328,843 | 7/1967 | Murphy et al. | 425/237 X |
| 3,366,717 | 1/1968 | Rohaus | 425/237 X |
| 3,547,682 | 12/1970 | Erb | 425/133.5 X |

*Primary Examiner*—Francis S. Husar
*Assistant Examiner*—Mark Rosenbaum
*Attorney, Agent, or Firm*—Darbo, Robertson & Vandenburgh

[57] ABSTRACT

From an extruder head a descending column of edible substance or medicament encased in a casing forming material of gelatin or dough is extruded. The casing forming material may be a single color or different colors on opposite sides. This column is pinched off by a pair of rotating wheels each having half cavities therein to form capsules or sticks of encased edible substance or medicament. The casing material is then hardened.

25 Claims, 9 Drawing Figures

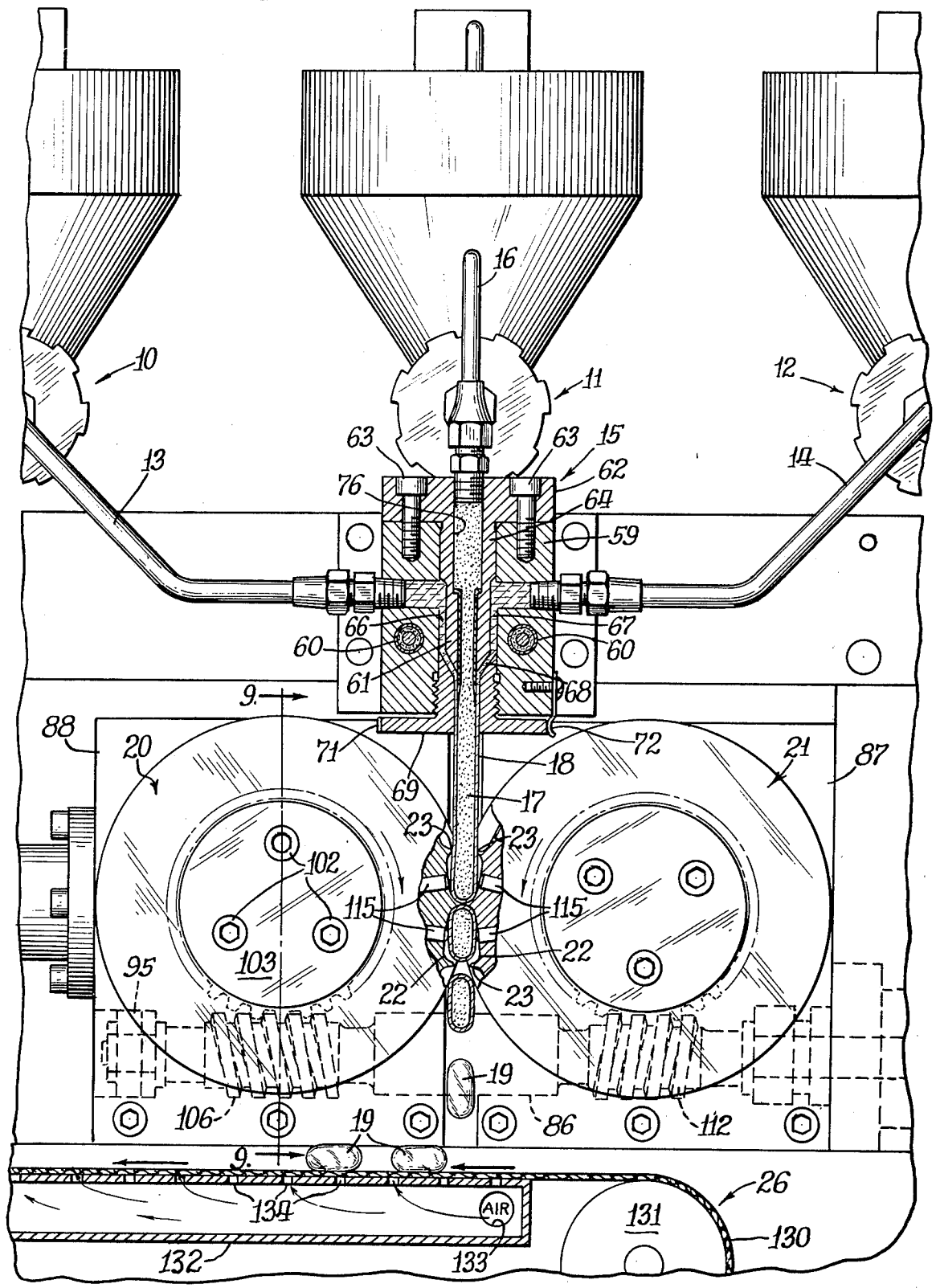
Fig. II.

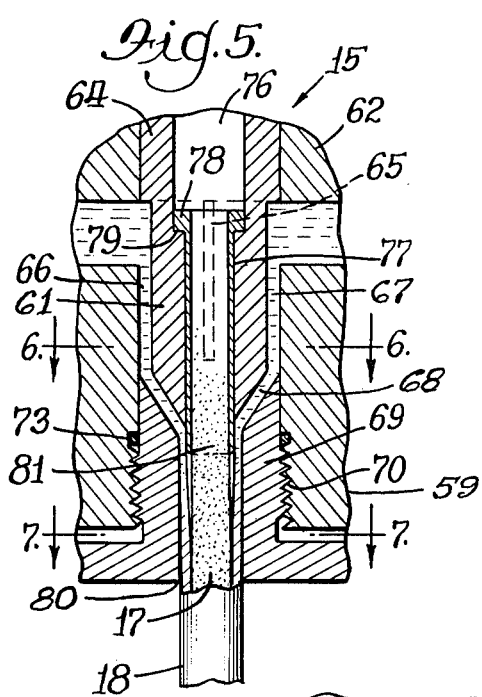
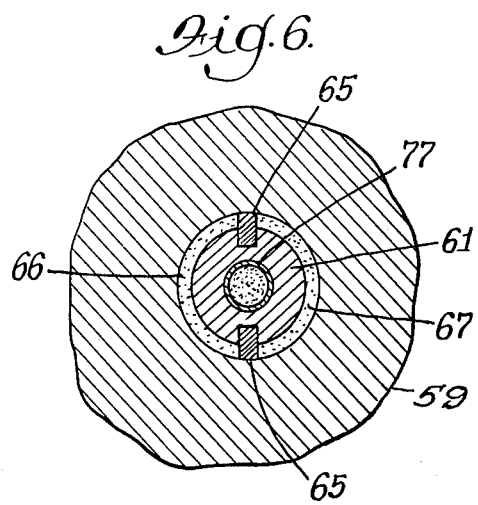
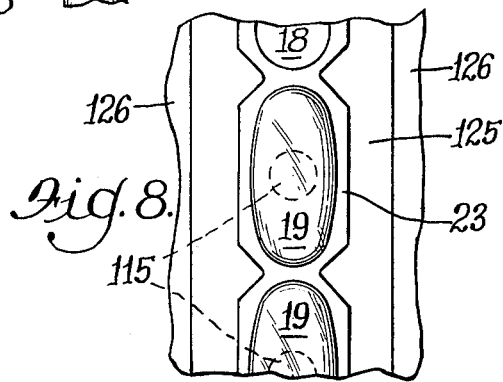
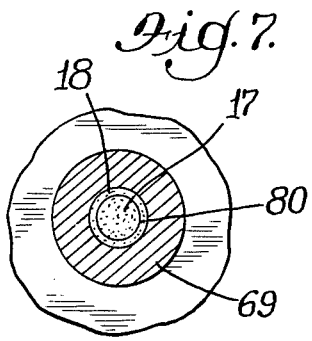
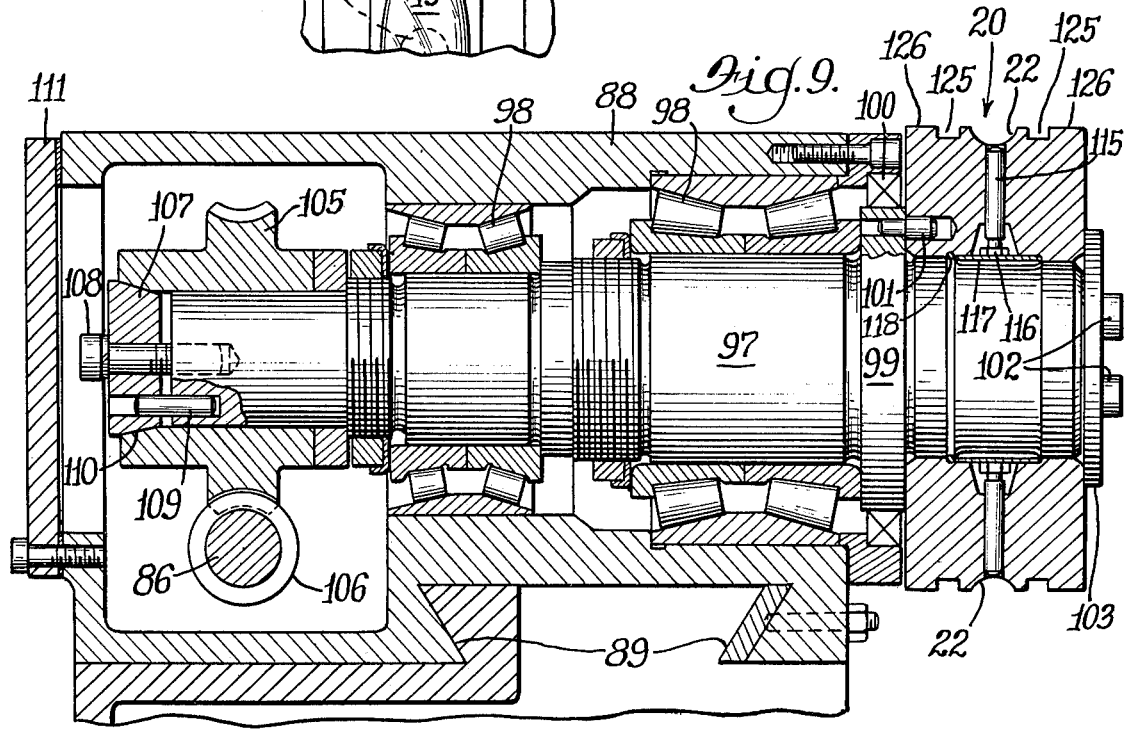

MANUFACTURE OF FILLED CAPSULES OR THE LIKE

RELATED APPLICATION

This application is a continuation-in-part of my pending application Ser. No. 519,435, filed Oct. 31, 1974, now abandoned entitled Manufacture Of Filled Gelatin Capsules.

BACKGROUND AND SUMMARY OF THE INVENTION

The present procedure for the encapsulation of medicament in a gelatin shell is to use two sheets or ribbons of gelatin between which discrete amounts of medicament are deposited. The sheets of gelatin are then cohered about each unit of medicament to define a capsule. For identification purposes, it is common that the two sheets of gelatin are of different colors so that the resulting capsule is two-toned in those colors. This procedure of using gelatin sheets has a number of disadvantages.

First and foremost, there is a substantial amount of wasted gelatin. While those parts of the gelatin sheets, remaining after the portions used to actually form the capsules have been removed, can be salvaged, it is not reusable as all or a part of a product to be ingested. There is danger that these remaining parts may have been contaminated by the medicament and thus ingested by a person not needing the medicament or for whom the medicament might be dangerous. Furthermore, when it is salvaged the colors are mixed. The result is that the gelatin can be sold only for use in a product, e.g. glue, which is not to be ingested. Such other gelatin products are normally made of a much lower quality gelatin and thus gelatin sold for that use has a substantially lower price tag. To sum it up, while the salvaged gelatin can be sold, there is a substantial loss in value of the salvaged gelatin. The amount of gelatin subject to the value loss is in the range of about ten to thirty percent.

Secondly, this conventional process necessitates the use of gelatin having a relatively high water content, for example, about forty percent. After the capsules are formed this water must be removed by drying. The drying process is slow, requiring from 36 to 96 hours depending on the thickness of the gelatin shell, the humidity conditions, etc. There are substantial costs in this drying, such as the cost of factory space (which is substantial), the direct costs, etc. Efforts to accelerate the drying have proven futile because the resulting capsules are likely to be deformed.

With some medicaments, the requirement that the gelatin have a relatively high water content has an additional disadvantage. This is that the medicament may tend to absorb water from the gelatin. This can have a deleterious effect on the medicament, the dosage, etc.

The present invention pertains to a machine for extruding a rod or column of edible substance or medicament having an annular shell of dough or gelatin and then pinching off that column into individual capsules consisting of the edible substance or medicament encased in the dough or gelatin from the annular shell of the column. The annular shell of the column can be half one color and half a second color, whereby the resulting capsule is two-toned for identification purposes. If desired, additional colors can be produced.

The present invention substantially overcomes the disadvantages discussed above with respect to the conventional process for forming capsules. There is practically no waste which results in a significant monetary saving. When gelatin is used for the shell its water content as extruded can be relatively low, e.g. in the neighborhood of 3 to 10 percent. This greatly reduces the problem of water removal after the capsules are formed and before they are packaged.

I am aware that it has previously been suggested that capsules could be formed by extruding a tube of gelatin into which is injected amounts of a medicament, with the tube being pinched off to form capsules (e.g. U.S. Pat. No. 2,449,139). However, to the best of my knowledge no capsules have been commercially manufactured by any such process and the process discussed initially herein is the one being used commercially at the present time. A principal object of the present invention is to provide a machine which is suitable for commercial use in the manufacture of capsules comprising a medicament encased in gelatin. The machine includes a number of features which permit the manufacturer to produce capsules to his individual requirements and/or desires.

Further objects and advantages will become apparent from the following description and the drawings herein.

DESCRIPTION OF THE DRAWINGS

FIG. 4 is an enlarged partial front view, as seen in FIG. 1, with portions broken away;

FIG. 5 is a further enlarged partial section of the extruder head as viewed in FIG. 4;

FIG. 6 is a partial section as seen at lines 6—6 of FIG. 5;

FIG. 7 is a partial section as viewed at line 7—7 of FIG. 5;

FIG. 8 is an enlarged developed view of the periphery of one of the capsule forming wheels showing the action of the wheels in forming the tube into capsules; and FIG. 9 is a partial section as seen at line 9—9 of FIG. 4.

DESCRIPTION OF SPECIFIC EMBODIMENT

Figure 1:
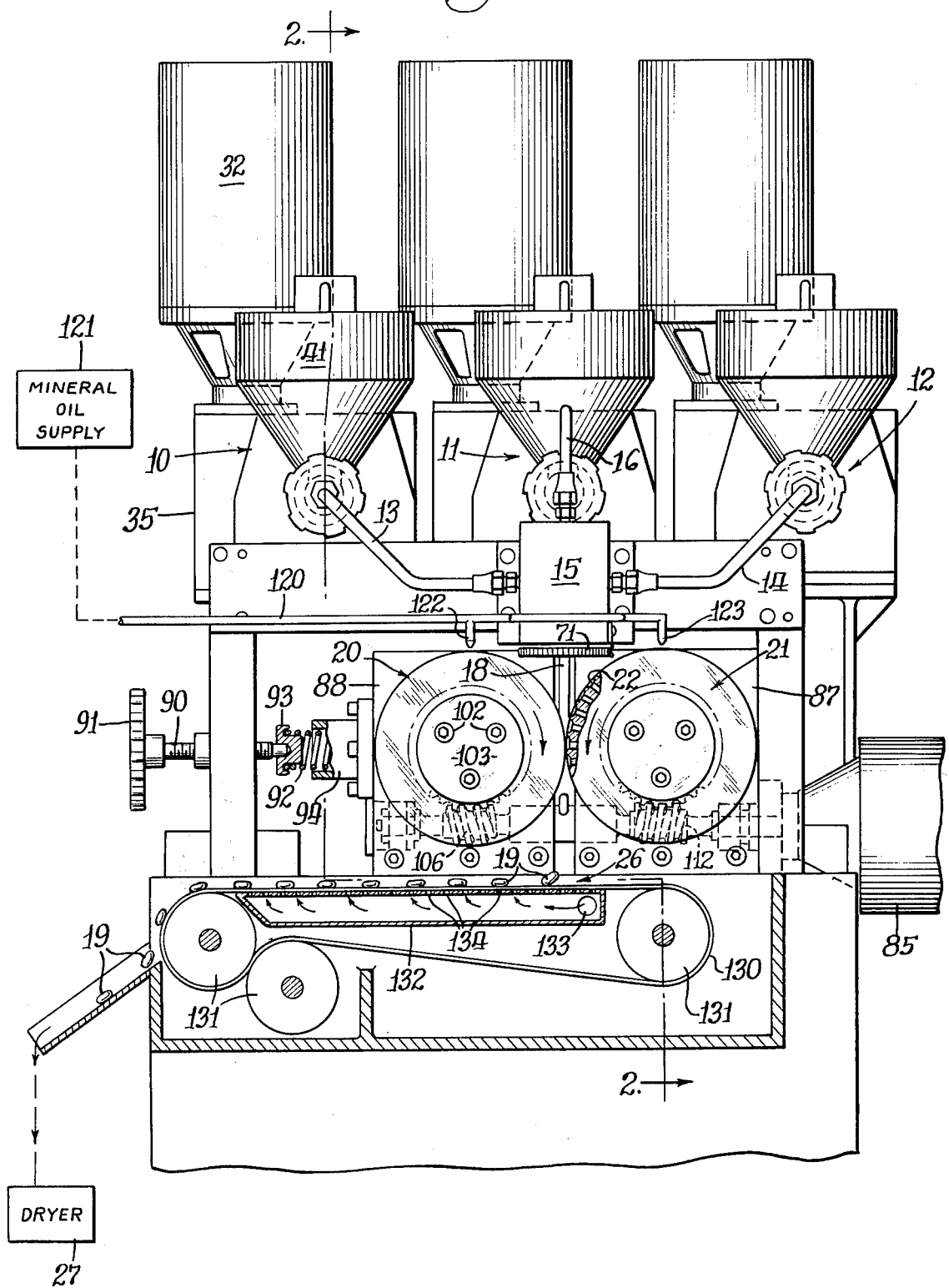
FIG. 1 is a front elevational view of an embodiment of the invention, with portions broken away.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disquise it by variations in form or additions or further improvements.

GENERAL ORGANIZATION

In the illustrated embodiment there are three supply means, generally 10–12, for supplying streams of a gelatin substance and medicament substance under pressure. The terms "gelatin material" and "medicament substance" are used herein to signify that they incorporate all or principal quantities of gelatin and medicament respectively. Supply means 10 and 12 force gelatin material under pressure through conduits 13 and 14, respectively, to an extruder head, generally 15. Supply means 11 forces the medicament substance through a conduit 16 to the extruder head. From the extruder head these issue as a rod consisting of a continuous core 17 of medicament substance encased in a tubular shell 18 of gelatin material. When gelatin material of different colors are put in supply means 10 and 12, respectively, the shell 18 will have one color on one side and the other color on the other side. This rod is divided into individual capsules 19 by a capsule molding means comprising two molding wheels, generally 20 and 21. Each wheel has a plurality of half-capsule-cavities 22 therein. Each cavity 22 has a rim 23 extending about both sides and both ends of the cavity. The rims 23 of these half-capsule-cavities meet at a pinch-point, which is on a line extending between the axes of wheels 20 and 21, to thereby pinch the rod to form the individual capsules. The peripheries of the wheels both move downwardly at the pinch-point.

From the molding means the capsules are cooled to promptly set up the gelatin. The cooling means, generally 26, is in the form of a conveyor extending transversely to the path of the capsules falling by gravity from the molding means. After the capsules are cooled they go to a dryer, generally 27, for removal of water from the gelatin substance. This dryer could be in the form of a tumbling dryer through which an air stream is passed.

GELATIN AND MEDICAMENT SUPPLY MEANS

Figure 2:
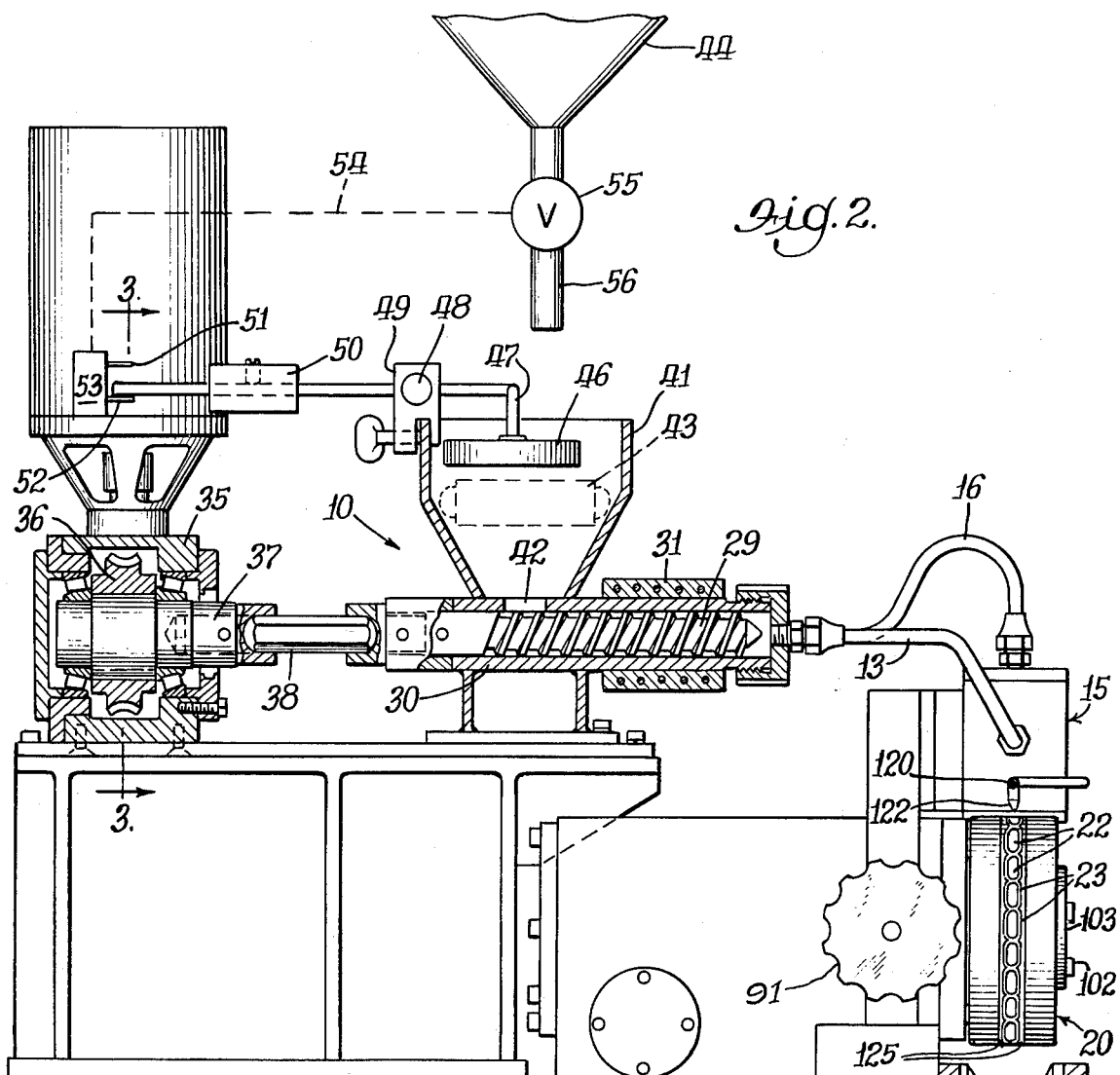
FIG. 2 is a section as viewed at line 2—2 of FIG. 1.
Figure 3:
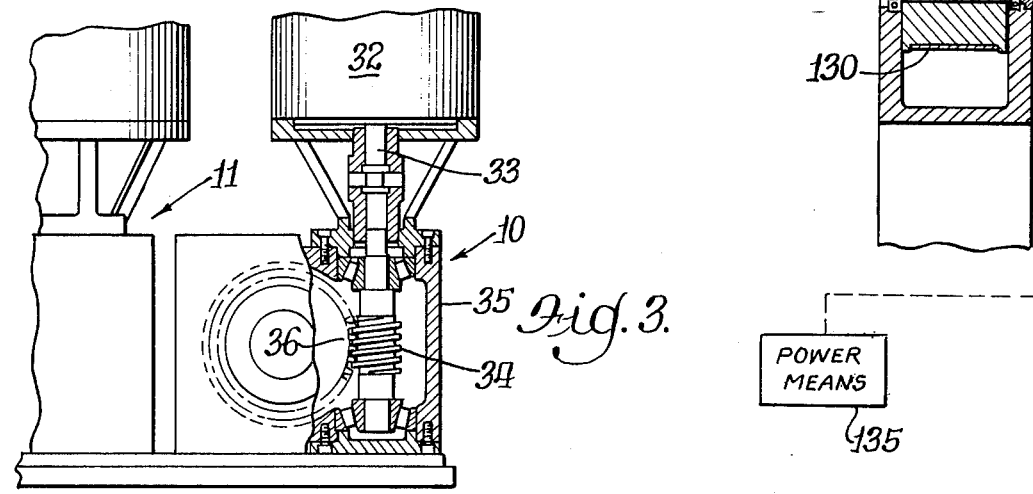
FIG. 3 is a partial rear elevational view, with a portion broken away to show a section as seen at line 3—3 of FIG. 2.

Supply means 10, best seen in FIGS. 2 and 3, is respective of the three supply means. It includes a positive displacement pump in the form of a worm 29 in a casing 30. A thermostatically controlled heater 31 about the casing maintains the proper temperature for keeping the gelatin substance at the proper fluid consistency. The worm is driven by a variable speed motor 32. The motor may be electric or hydraulic. Since naptha will be present, at least at times, an electric motor should be explosion-proof. The output shaft 33 of the motor is coupled to the shaft of an input worm 34 of a gear box 35. In turn the worm drives a worm wheel 36 mounted on an output shaft 37. A coupling 38 connects shaft 37 with worm 29.

The gelatin substance flows by gravity from a feed hopper 41 through an opening 42 into the interior of casing 30. The gelatin substance in feed hopper 41 is maintained at the proper fluidic temperature by a heater 43. In turn, the gelatin substance for the feed hopper 41 comes from a supply hopper 44. Feed hopper 41 is comparatively small and supply hopper 44 is comparatively large. Supply hopper 44 is not fixedly mounted but is movable, as by means of an overhead track, etc. Thus, when it is desired to change the color of the gelatin substance being furnished by supply means 10, there is only relatively little gelatin substance in feed hopper 41 which must then be cleaned out. The previous supply hopper 44 is moved away and a new supply hopper 44 containing gelatin substance of the substituted color is positioned in its stead. Upon making a color change, there is no necessity for cleaning out a large container such as is represented by supply hopper 44.

The two hoppers include an automatic control for maintaining the quantity of gelatin substance in feed hopper 41 between predetermined maximum and minimum limits. In the illustrated embodiment this includes a float 46 in the feed hopper 41. This float is mounted on one end of an arm 47. This arm extends through and is secured to a pivot pin 48 journaled in a support 49 attached to feed hopper 41. The arm has a counterweight 50 adjustably mounted thereon. The other end of the arm is positioned to engage autuators 51 and 52 of a switch 53. As indicated by dashed line 54, switch 53 is connected (as by means of a plug-in connection) to a motor operated valve 55 in the discharge line 56 of supply hopper 44. Depending upon the type of valve motor operation, switch 53 may be electrical, fluid, etc. As the level of gelatin in feed hopper 41 reaches the desired minimum, arm 47 pivots clockwise sufficiently to move switch actuator 51 and open valve 55. When the feed hopper 41 has been filled to the desired maximum extent, the arm 47 pivots counterclockwise sufficiently to engage switch actuator 52 and close valve 55.

EXTRUDER HEAD

Referring particularly to FIGS. 4 and 5, the extruder head 15 is a three-part unit. It comprises a main body part 59 secured to the machine frame. In this main body part are electric heaters 60 to maintain the required fluidic temperature. The main body part has a vertically positioned cylindrical opening into which extends the nose 61 of a head part 62. The head part is held in place by cap screws 63. The upper portion 64 of nose 61 closes the top of the opening in the main body part.

The lower end of nose 61 is smaller than the opening in the main body part and has two diametrically opposed partitions 65. Thus, it divides the opening into two chambers 66 and 67. Chamber 66 communicates with conduit 13 and chamber 67 communicates with conduit 14. Below the partition 65 there is an annular opening 68 of truncated conical configuration between the lower or distal end of nose 61 and the top of the third body part 69. The third body part is threaded into the main body part as seen at 70. Thus, the width or thickness of the truncated conical opening 68 can be adjusted and thereby adjust the thickness of the gelatin shell 18. To maintain the desired adjustment, the exterior of the third body part 69 has a plurality of spaced teeth 71 thereabout. A spring retainer 72 secured to main body part 59 fits between these teeth. By moving the retainer outward, the third body part 69 can be rotated. An O-ring 73 maintains a seal between the main body part and the third body part.

The upper portion of head part 62 has a relatively large diameter opening 76 and the lower portion has a smaller opening within which is received an annular tube 77. The upper end of the tube has an annular enlargement 78 which seats on a shoulder 79 at the juncture of the two openings. The bottom of tube 77 extends below the distal end of nose 61. The third body part 69 has an opening 80 which is the same diameter as that of the exterior of tube 77. The tube is of stainless steel and has a wall thickness of 0.015 to 0.020 inches (0.381 to 0.508 m.m.). The gelatin substance issuing from annular opening 68 initially forms a cylindrical shell about tube 77. At the bottom of the tube this shell will have an internal diameter greater than the external diameter of the rod of medicament substance issuing from the bottom of the internal opening 81 in the tube, the difference being the wall thickness of the tube. While this difference in size may not be mantained completely, there will be a size difference between the gelatin shell and the medicament core which facilitates the forming of the rod 17, 18 into capsules, since at the time of capsule formation there must be provision to permit the gelatin to be closed over the ends of the medicament.

If tri-colored capsules were dried, partitions 65 would be arranged to divide the opening into three chambers rather than the two 66, 67. A third gelatin supply means identical to 10, 12 would communicate with the third chamber and each of the three would hold gelatin of a different color. Obviously, the described apparatus can thus be used to produce capsules of the number and variety of colors desired.

CAPSULE MOLDING MEANS

The molding wheels 20, 21 are driven by a common motor 85. A drive shaft 86 is connected by a coupling to the output shaft of the motor. This drive shaft extends through gear boxes 87 and 88. The molding wheel 21 extends from a shaft in gear box 87 while molding wheel 20 extends from a shaft in gear box 88. Gear box 87 is fixedly mounted on the frame of the machine. Gear box 88 is on ways 89 so that it may be moved toward and away from gear box 87. The shaft 90 of an adjusting wheel 91 is threaded through the machine frame. A spring 92 is in compression between a cap 93 rotatably mounted on the end of shaft 90 and a socket 94 on gear box 88. This arrangement permits the spring pressure to be applied against gear box 88 so as to control the contact pressure between the molding wheels 20 and 21. Bearing 95 for shaft 86 is movable in gear box 88 to permit the described gear box movement.

FIG. 9 illustrates the structure within gear box 88. There is a shaft 97 rotatably mounted in bearings 98. The end play of the shaft is strictly limited. Adjacent its outer end the shaft has a flange 99 about which is a seal 100. The wheel 20 is secured to the shaft by a pin 101 extending into the flange and cap screws 102 which extend through a cover plate 103 and are threaded into the end of the shaft.

A worm wheel 105 is mounted on the inner end of shaft 97 and engages a worm 106 formed on shaft 86. A conically tapered cap 107 is secured to the end of shaft 97 by a bolt 108. It is also held against rotation with respect to the shaft by a pin 109. The adjacent end of the hub of worm wheel 105 has a corresponding conical taper 110. When bolt 108 is tightened the frictional engagement between the conical surfaces of cap 107 and the worm wheel 105 causes the rotation of the wheel to produce a corresponding rotation of shaft 97. However, by loosening bolt 108 the worm wheel 105 can be rotated on shaft 97 to a different position with respect to the shaft. When bolt 108 is again retightened, the wheel and shaft are locked in the new alignment. This permits the alignment of wheel 20 with respect to the angular alignment of wheel 21. A cover plate 111 may be removed from the gear box to permit this adjustment to be made.

The structure within gear box 87 is for all practical purposes identical with that just described with respect to gear box 88. However, the worm wheel (not shown) in gear box 87 and in engagement with worm 112 on shaft 86 is keyed to the shaft that supports wheel 21 rather than being adjustably mounted thereon as just described with respect to shaft 97 and worm wheel 105.

The molding wheels 20, 21 have a plurality of radial bores each of which intersects the center of the bottom of each half-capsule-cavity 22 respectively. Within each bore is a knock-out pin 115. At its inner end each pin has a head 116 which forms a stop controlling the positioning of the pin. A sleeve 117 within the wheel holds the knock-out pins in place. The sleeve is held within the wheel by a retainer ring 118.

The knock-out pins operate primarily by the pull of gravity, although they are not completely free of centrifugal force. When the pin is at the top of the wheel it is in the position illustrated in FIG. 9. When the pin approaches, or is at, the bottom of the wheel it is pulled down by gravity so thaat it extends out into the respective half-capsule-cavity 22. Thus, if a capsule 19 has improperly stuck in the cavity the action of the pin as that cavity approaches the bottom of the wheel will push the capsule out of the cavity.

As a further aid to preventing the capsules from sticking in the cavities 22, the cavities may be coated with mineral oil. To this end there is a conduit 120 which connects to a source of mineral oil 121. The conduit has nozzles 122 and 123 over wheels 20 and 21, respectively, to permit a drop of mineral oil to be deposited in each cavity. When mineral oil is used, it will be necessary to subsequently wash it from the finished capsules.

At the periphery of the wheels 20, 21 there is a relief cup into the surface of the wheel which relief defines the rim 23 surrounding each half-capsule-cavity or pocket 22. In addition, this relief forms grooves 125 extending annularly about the periphery of the wheel. The remainder of the wheel surface is uncut leaving a pair of rims 126 about the periphery of the wheel. Since the rims 126 have the same radius as rims 23 surrounding the pockets 22 the latter are protected so as to prevent damage to them when pressure is supplied through the use of hand wheel 91 and spring 92.

The wheels 20, 21 rotate at a common angular speed. However, they are not exactly the same diameter. Thus, for example, wheel 20 is 6 inches (15.24 centimeters) in diameter and wheel 21 is 6 3/16 inches (15.72 centimeters) in diameter. Thus, the linear speed of the periphery of the wheels is not identical. This results in a shearing action between rims 23 of the two wheels when the wheels are at the pinchpoint. This shearing action aids in severing the gelatin sheath between the adjacent ends of the capsules being formed.

Referring to FIG. 8, it will be seen that the width of the half-capsule-cavities 22 is slightly greater than the width of the exterior of the gelatin sheath 18 of the descending rod. This permits the capsule to grow in width so that it assumes a somewhat oval shape as distinguished from the cylindrical configuration of the original rod. This is done, along with the increasing of the size of the sheath 18 (as previously described), so as to enable the gelatin coating to be molded over the ends of the medicament core.

CAPSULE COOLING MEANS

The cooling means 26 includes a conveyor comprised of a foramenous belt 130. The belt is trained for movement along a path defined by pulleys 131. One of the pulleys is driven by a suitable power means 135 so that the upper run of the belt moves to the left in FIG. 1. Below this upper run of the belt is an air chamber 132 which receives cooling air from a duct 133. The top of the air chamber is perforated with discharge holes 134 so that the cooling air flows out through the foramenous belt 130 to cool the capsules 19 as they are moving along the upper run of the belt.

MISCELLANEOUS

While the formulation of the gelatin substance deposited in the feed hoppers 41 will be varied by individual manufacturers, I contemplate using a formulation such that 50 pounds (22.68 kg.) of glycerin and 5 to 10 pounds (2.27 to 4.54 kg.) of water are added to 100 pounds (45.36 kg.) of pure gelatin. It is important that the water and glycerin are cold when they are added to the gelatin in order to prevent the gelatin from balling. Any of the various conventional coloring materials may be incorporated as desired.

In most instances, the medicament substance deposited in the feed hopper of supply means 11 will be in a carrier. I prefer an oil based thick paste as a carrier not only for reasons of economy but also so that the oil serves as a water barrier to prevent migration of the water in the gelatin into the medicament. Often, it will be possible to include more active medicament in a paste than in a liquid thereby reducing the size of the resulting capsule required. A fluid paste is more adaptable to the described process of molding capsules than is an unthickened liquid. Suitable food thickeners such as gelatin or starch can be employed to achieve the fluid paste consistency.

The present invention can be employed to form capsules or sticks consisting of materials other than a medicament with a gelatin coating. For example, the hopper of extruder 11 may be filled with an extrudable edible substance. This might be a candy in a liquid or paste form (which is included within the term "food" as used herein). It could be a liver pate, a processed cheese of a flowable (extrudable) consistency, fruit or vegetable base substances of such consistency or a combination of such materials. An ingestable material for use as a sheath as an alternative to the gelatin would be one of well known, wide variety of dough. Such dough would be put into the hoppers of extruders 10 and 12 processed as above described except that instead of using a cooling air stream such as is employed when the sheath is gelatin, other means of conventionally hardening a dough after the capsule or stick was formed would be employed. For example, a current of heated air could be substituted for the refrigerated air entering plenum 132 through opening 133 to cook and/or dry the dough. Another alternative would be to pass the discharge conveyor 130 through a tunnel oven to perform the cooking and/or drying of the dough.

A specific example of a suitable dough formulation would be as follows:

31 gallons (260 pounds) boiling water
8 pounds butter
8 pounds of lard or shortening
15 pounds of sugar
12 pounds of salt
125 commercial yeast cakes, or equivalent, dissolved in
2 gallons of lukewarm water
375 pounds sifted bread flour The butter, lard, sugar and salt are put in a power driven dough mixer. With the mixer operating, the boiling water would be added. When the solids had dissolved and the water had cooled to lukewarm, the dissolved yeast and 375 pounds of flour are added and the mixing continued until a uniform mix was obtained. As an alternative, only 16 gallons of boiling water would be employed with the butter, lard, sugar and salt dissolved as above described. After the solution had cooled to lukewarm, 15 gallons of warm milk and the dissolved yeast are added, followed by the 375 pounds of sifted bread flour.

I claim:

1. An apparatus for making units comprising an ingestable substance with a coating of ingestable material, said apparatus comprising:
   first means forming a source of said substance in fluid form under pressure;
   second means adjacent said first means forming a source of said material in fluid form under pressure;
   extruder means comprising a body having a vertical passageway open at the bottom, said extruder means being connected to said first and second means for extruding a rod comprising a continuous core of said substance with a continuous coating of said material along a vertically downward path from said bottom opening;
   unit molding means subsequent said extruder means for forming said rod into individual units and comprising two endless devices each positioned at a respective side of said path below said opening, each device having a surface with a sequence of half-unit-cavities therein which move past said path in a downward direction in timed relationship such that the half-unit-cavities of the two devices meet at said path to define a whole-unit-cavity, each half-unit-cavity comprising walls defining a pocket having sides and ends, each endless device being a wheel rotating about an axis and having a periphery with the half-unit-cavities therein, the peripheries of said wheels meeting at a pinch-point on a line between said axes, each wheel including means associated with each half-unit-cavity for pushing the unit away therefrom after the wheel moves away from the pinch-point, the periphery of each wheel defining a rim surrounding the exterior of each pocket and extending radially outwardly from the portion of the wheel periphery to the outside of the rim, the rims of the wheels being in registry at the pinch-point, said molding means including means mounting one of the wheels for movement toward and away from the other wheel to adjust the pressure between the rims at the pinch-point; and
   means positioned below said molding means for receiving the individual units descending by gravity from the molding means and for cooling the material, said cooling means comprising a foramenous conveyor and means operatively associated with said conveyor for directing cooling air through said conveyor.

2. An apparatus as set forth in claim 1, wherein the periphery of one wheel is larger than the periphery of the other wheel, said molding means including power means rotating said wheels at a common angular speed whereby the periphery of one wheel slips with respect to the periphery of the other wheel at the pinch-point.

3. An apparatus as set forth in claim 2, wherein said extruder means includes an annular tube within said body above said opening and axially aligned with said passageway, said tube having an upper end and a lower end with the upper end communicating with said first means to receive said substance for discharge at the lower end, said body defining an annular opening about said tube adjacent the lower end of the tube, said annular opening communicating with said second means.

4. An apparatus as set forth in claim 3, wherein said second means includes a first conduit through which said material of one color is supplied and a second conduit through which said material of a second color is supplied, said body defining two chambers above said annular opening, said two chambers each having an upper end and a lower end, the lower end of the chambers communicating with said annular opening, the upper end of the chambers communicating with said conduits respectively, each of said chambers extending approximately half-way about the axis of the tube, whereby said coating is about half one color material and about half material of the second color.

5. An apparatus as set forth in claim 4,
wherein the material is gelatin and the second means includes two pumps, each having an intake and a discharge opening, said conduits communicating with said discharge openings respectively, each pump having a relatively small feed hopper communicating with its intake opening, and heater means controlling the temperature of the gelatin material in the feed hopper and pump; and
including a plurality of supply hoppers, each for holding a gelatin material of a particular color, said supply hoppers being large compared to said feed hoppers, whereby when a particular side of the coating is to be of a particular color the supply hopper holding the gelatin material of that particular color may be used to fill the feed hopper of the respective pump, and when the color of that coating side is to be changed there is only a relatively small amount of gelatin material in that feed hopper to be cleaned out along with the gelatin material downstream therefrom.

6. An apparatus for making units comprising an ingestable substance with a coating of ingestable material, said apparatus comprising:
first means forming a source of said substance in fluid form under pressure;
second means adjacent said first means forming a source of said material in fluid form under pressure;
extruder means comprising a body having a vertical passageway open at the bottom, said extruder means being connected to said first and second means for extruding a rod comprising a continuous core of said substance with a continuous coating of said material along a vertically downward path from said bottom opening, said extruder means including an annular tube within said body above said opening and axially aligned with said passageway, said tube having an upper end and a lower end with the upper end communicating with said first means to receive said substance for discharge at the lower end, said body defining an annular opening about said tube adjacent the lower end of the tube, said annular opening communicating with said second means;
unit molding means subsequent said extruder means for forming said rod into individual units and comprising two endless devices each positioned at a respective side of said path below said opening, each device having a surface with a sequence of half-unit-cavities therein which move past said path in a downward direction in timed relationship such that the half-unit-cavities of the two devices meet at said path to define a whole-unit-cavity, each half-unit-cavity comprising walls defining a pocket having sides and ends; and
means positioned below said molding means for receiving the individual units descending by gravity from the molding means and for hardening the material.

7. An apparatus as set forth in claim 6, wherein said annular opening is of truncated conical configuration, said body including a first member above said opening and a second member below said opening, one of said members being movable axially with respect to the other of said members for varying the thickness of said truncated conical opening.

8. An apparatus as set forth in claim 7, wherein said first member has a first opening approximately the same diameter as the exterior of the tube and a second opening above said first opening and of a larger diameter, said first member forming a shoulder at the juncture of the first and second openings, said tube having an external enlargement at the upper end thereof, said tube being positioned in the first opening with said enlargement resting on said shoulder, the lower end of the tube extending below the lower end of the first member.

9. An apparatus as set forth in claim 8, wherein said passageway has a diameter approximately equal to the external diameter of the tube.

10. An apparatus as set forth in claim 8, wherein said second means includes a first conduit through which said material of one color is supplied and a second conduit through which said material of a second color is supplied, said body defining two chambers above said annular opening, said two chambers each having an upper end and a lower end, the lower end of the chambers communicating with said annular opening, the upper end of the chambers communicating with said conduits respectively, each of said chambers extending approximately half-way about the axis of the tube, whereby said coating is about half one color material and about half material of the second color.

11. An apparatus as set forth in claim 6, wherein said first member has a first opening approximately the same diameter as the exterior of the tube and a second opening above said first opening and of a larger diameter, said first member forming a shoulder at the juncture of the first and second openings, said tube having an external enlargement at the upper end thereof, said tube being positioned in the first opening with said enalargement resting on said shoulder, the lower end of the tube extending below the lower end of the first member.

12. An apparatus as set forth in claim 11, wherein said passageway has a diameter approximately equal to the external diameter of the tube.

13. An apparatus as set forth in claim 6, wherein said second means includes a first conduit through which said material of one color is supplied and a second conduit through which said material of a second color is supplied, said body defining two chambers above said annular opening, said two chambers each having an upper end and a lower end, the lower end of the chambers communicating with said annular opening, the upper end of the chambers communicating with said conduits respectively, each of said chambers extending approximately half-way about the axis of the tube, whereby said coating is about half one color material and about half material of the second color.

14. An apparatus as set forth in claim 13,
wherein the second means includes two continuous pumps, each having an intake and a discharge opening, said conduits communicating with said discharge openings respectively, each pump having a relatively small feed hopper communicating with its intake opening; and including a plurality of supply hoppers, each for holding said material of a particular color, said supply hoppers being large compared to said feed hoppers, whereby when a particular side of the coating is to be of a particular color the supply hopper holding the material of that particular color may be used to fill the feed hopper of the respective extruder, and when the color of that coating side is to be changed there is only a relatively small amount of material in that feed hopper to be cleaned out along with the material downstream therefrom.

15. An apparatus as set forth in claim 14, wherein each supply hopper includes an automatic valve means, and each feed hopper includes sensing means for determining when the feed hopper is relatively full and when it is relatively empty of material, and including means connecting the sensing means to the automatic valve means for opening the valve means when the feed hopper is relatively empty and closing the valve means when the feed hopper is relatively full.

16. An apparatus for making units comprising an ingestable substance with a coating of ingestable material, said apparatus comprising:

first means forming a source of said substance in fluid form under pressure;

second means adjacent said first means forming a source of said material in fluid form under pressure;

extruder means comprising a body having a vertical passageway open at the bottom, said extruder means being connected to said first and second means for extruding a rod comprising a continuous core of said substance with a continuous coating of said material along a vertically downward path from said bottom opening;

unit molding means subsequent said extruder means for forming said rod into individual units and comprising two endless devices each positioned at a respective side of said path below said opening, each device having a surface with a sequence of half-unit-cavities therein which move past said path in a downward direction in timed relationship such that the half-unit-cavities of the two devices meet at said path to define a whole-unit-cavity, each half-unit-cavity comprising walls defining a pocket having sides and ends, each endless device being a wheel rotating about an axis and having a periphery with the half-unit-cavities therein, the peripheries of said wheels meeting at a pinch-point on a line between said axes, each wheel including means associated with each half-unit-cavity for pushing the capsule away therefrom after the wheel moves away from the pinch-point, the periphery of each wheel defining a rim surrounding the exterior of each pocket and extending radially outwardly from the portion of the wheel periphery to the outside of the rim, the rims of the wheels being in registry at the pinch-point, said molding means including means mounting one of the wheels for movement toward and away from the other wheel to adjust the pressure between the rims at the pinch-point; and means positioned below said molding means for receiving the individual units descending by gravity from the molding means and for hardening the material.

17. An apparatus for making units comprising an ingestable substance with a coating of ingestable material, said apparatus comprising:

first means forming a source of said substance in fluid form under pressure;

second means adjacent said first means forming a source of said material in fluid form under pressure;

extruder means comprising a body having a vertical passageway open at the bottom, said extruder means being connected to said first and second means for extruding a rod comprising a continuous core of said substance with a continuous coating of said material along a vertically downward path from said bottom opening;

unit molding means subsequent said extruder means for forming said rod into individual units and comprising two endless devices each positioned at a respective side of said path below said opening, each device having a surface with a sequence of half-unit-cavities therein which move past said path in a downward direction in timed relationship such that the half-unit-cavities of the two devices meet at said path to define a whole-unit-cavity, each half-unit-cavity comprising walls defining a pocket having sides and ends, each endless device being a wheel rotating about an axis and having a periphery with the half-unit-cavities therein, the peripheries of said wheels meeting at a pinch-point on a line between said axes, the periphery of one wheel being larger than the periphery of the other wheel, said molding means including power means rotating said wheels at a common angular speed whereby the periphery of one wheel slips with respect to the periphery of the other wheel at the pinch-point; and means positioned below said molding means for receiving the individual units descending by gravity from the molding means and for hardening the material.

18. An apparatus for making units comprising an ingestable substance with a coating of ingestable material, said apparatus comprising:

first means forming a source of said substance in fluid form under pressure;

second means adjacent said first means forming a source of said material in fluid form under pressure;

extruder means comprising a body having a vertical passageway open at the bottom, said extruder mens being connected to said first and second means for extruding a rod comprising a continuous core of said substance with a continuous coating of said material along a vertically downward path from said bottom opening, said body including a main body part having a first opening coaxial with said passageway and relatively large in diameter as compared to the size of the passageway, and a transverse opening intersecting said first opening, said transverse opening communicating with said second means to receive the material, a second body part extending into said first opening and closing the top of the first opening, said second body part having a nose of a diameter smaller than the first opening, said nose extending downwardly from the transverse opening, said second body part having an opening axially through said nose and communicating with said first means to receive said substance, and a third body part extending into the bottom of said first opening, said passageway being on the third body part, said third body part being adjustable up and down whereby its spacing to the second body part may be varied;

unit molding means subsequent said extruder means for forming said rod into individual units and comprising two endless devices each positioned at a respective side of said path below said opening, each device having a surface with a sequence of half-unit-cavities therein which move past said path in a downward direction in timed relationship such that the half-unit-cavities of the two devices meet at said path to define a whole-unit-cavity, each half-unit-cavity comprising walls defining a pocket having sides and ends; and means positioned below said molding means for receiving the individual units descending by gravity from the molding means and for hardening the material.

19. An apparatus as set forth in claim 18, wherein said second means includes a first conduit through which said material of one color is supplied and a second conduit through which said material of a second color is supplied, said main body part having a second transverse opening opposite the first mentioned transverse opening and intersecting said first opening, said transverse opening communicating with said conduits respectively, said body including two diametrically opposed partitions in said first opening and between the main body part and the second body part, said partitions extending from the closed top of the first opening to a point adjacent the distal end of the nose.

20. An apparatus for making units comprising an ingestable substance with a coating of ingestable material, said apparatus comprising:

first means forming a source of said substance in fluid form under pressure;

second means adjacent said first means forming a source of said material in fluid form under pressure;

extruder means comprising a body having a vertical passageway open at the bottom, said extruder means being connected to said first and second means for extruding a rod comprising a continuous core of said substance with a continuous coating of said material along a vertically downward path from said bottom opening;

unit molding means subsequent said extruder means for forming said rod into individual units and comprising two endless devices each positioned at a respective side of said path below said opening, each device having a surface with a sequence of half-unit-cavities therein which move past said path in a downward direction in timed relationship such that the half-unit-cavities of the two devices meet at said path to define a whole-unit-cavity, each half-unit-cavity comprising walls defining a pocket having sides and ends, each endless device being a wheel rotating about an axis and having a periphery with the half-unit-cavities therein, the peripheries of said wheels meeting at a pinch-point on a line between said axes, each wheel including means associated with each half-unit-cavity for pushing the unit away therefrom after the wheel moves away from the pinch-point comprising:

each wheel having radial bores intersecting the bottom of each cavity respectively, a pin positioned in each bore respectively and movable in the bore radially of the wheel, and each pin including means to restrict the radial movement of the pin to between a radial position at which the pin protrudes into the cavity and a radial position at which it does not protrude into the cavity; and means positioned below said molding means for receiving the individual units descending by gravity from the molding means and for hardening the material.

21. In an apparatus for making units comprising an ingestable substance in an ingestable coating material wherein forming means produces a rod of said material having a core of said substance which rod is moved along a path in a descending direction, the improvement comprising:

unit molding means subsequent said forming mens for forming said rod into individual units and comprising two endless devices each positioned at a respective side of said path below said opening, each device having a surface with a sequence of half-unit-cavities therein which move past said path in a downward direction in timed relationship such that the half-unit-cavities of the two devices meet at said path to define a whole-unit-cavity, each half-unit-cavity comprising walls defining a pocket having sides and ends, the half-unit-cavities of one device moving at a different linear speed during that meeting than the half-unit-cavities of the other device whereby during that meeting there is a slip between the part of the devices surrounding the two half-unit-cavities.

22. In an apparatus as set forth in claim 21, wherein said forming means comprises:

first fluid supply means for said substance;

second fluid supply means for said material adjacent said first fluid supply means;

extruder means comprising a body having a vertical passageway open at the bottom with said rod exiting from said bottom opening to move along said path, said body including a main body part having a first opening coaxial with said passageway and relatively large in diameter as compared to the size of the passageway, and a transverse opening intersecting said first opening, said transverse opening communicating with said second supply means to receive the material, a second body part extending into said first opening and closing the top of the first opening, said second body part having a nose of a diameter smaller than the first opening, said nose extending downwardly below the transverse opening, said second body part having an opening axially through said nose and communicating with said first supply means to receive said substance, and a third body part extending into the bottom of said first opening, said passageway being on the third body part, said third body part being adjustable up and down whereby its spacing to the second body part may be varied to thereby vary the quantity of material entering the first opening below said second body part.

23. In an apparatus as set forth in claim 22, wherein said forming means includes:

an annular tube within said opening in said second body part, said tube having an upper end and a lower end with the upper end receiving said substance for discharge at the lower end, the lower end of the tube extending into said first opening below said second body part, said first member having a second opening above said first opening and of a larger diameter, said first member forming a shoulder at the juncture of the first and second openings, said tube having an external enlargement at the upper end thereof, said tube being positioned in the first opening with said enlargement resting on said shoulder.

24. In an apparatus for making units comprising an ingestable substance in an ingestable coating material wherein forming means produces a rod of said material having a core of said substance which rod is moved along a path in a descending direction, the improvement wherein said forming means comprises:

first fluid supply means for said substance;

second fluid supply means for said material adjacent said first fluid supply means;

extruder means comprising a body having a vertical passageway open at the bottom with said rod exiting from said bottom opening to move along said path, said body including a main body part having a first opening coaxial with said passageway and relatively large in diameter as compared to the size of the passageway, and a transverse opening intersecting said first opening, said transverse opening communicating with said second supply means to receive the material, a second body part extending into said first opening and closing the top of the first opening, said second body part having a nose of a diameter smaller than the first opening, said nose extending downwardly below the transverse opening, said second body part having an opening axially through said nose and communicating with said first supply means to receive said substance, a third body part extending into the bottom of said first opening, said passageway being on the third body part, said third body part being adjustable up and down to establish a position whereby its spacing to the second body part may be varied to thereby vary the quantity of material entering the first opening below said second body part, and retaining means engaging said third body part for normally maintaining the established position of the third body part with respect to the second body part.

25. In an apparatus for making units comprising an ingestable substance in an ingestable coating material wherein forming means produces a rod of said material having a core of said substance which rod is moved along a path in a descending direction, the improvement wherein said forming means comprises:

first fluid supply means for said substance;

second fluid supply means for said material adjacent said first fluid supply means;

extruder means comprising a body having a vertical passageway open at the bottom with said rod exiting from said bottom opening to move along said path, said body including a main body part having a first opening coaxial with said passageway and relatively large in diameter as compared to the size of the passageway, and a transverse opening intersecting said first opening, said transverse opening communicating with said second supply means to receive the material, a second body part extending into said first opening and closing the top of the first opening, said second body part having a nose of a diameter smaller than the first opening, said nose extending downwardly below the transverse opening, said second body part having an opening axially through said nose and communicating with said first supply means to receive said substance, and a third body part extending into the bottom of said first opening, said passageway being on the third body part, said third body part being adjustable up and down whereby its spacing to the second body part may be varied to thereby vary the quantity of material entering the first opening below said second body part, said forming means including:

an annular tube within said opening in said second body part, said tube having an upper end and a lower end with the upper end receiving said substance for discharge at the lower end, the lower end of the tube extending into said first opening below said second body part, said first member having a second opening above said first opening and of a larger diameter, said first member forming a shoulder at the juncture of the first and second openings, said tube having an external enlargement at the upper end thereof, said tube being positioned in the first opening with said enlargement resting on said shoulder.

* * * * *

UNITED STATES PATENT AND TRADEMARK OFFICE
CERTIFICATE OF CORRECTION

PATENT NO. : 4,028,024
DATED : June 7, 1977
INVENTOR(S) : Stephen T. Moreland

It is certified that error appears in the above-identified patent and that said Letters Patent are hereby corrected as shown below:

Column 3, lines 30-31, "respective" should read --representative--.
Column 4, line 4, "autuators" should read --actuators--.
Column 5, line 3, "dried" should read --desired--.
Column 6, line 9, "thaat" should read --that--.
Column 10, line 47, "enalargement" should read --enlargement--.
Column 12, line 54, "mens" should read --means--.
Column 14, line 22, "mens" should read --means--.

Signed and Sealed this

Eleventh Day of October 1977

[SEAL]

Attest:

RUTH C. MASON
Attesting Officer

LUTRELLE F. PARKER
Acting Commissioner of Patents and Trademarks